Patented June 30, 1953

2,643,994

UNITED STATES PATENT OFFICE 2,643,994

CONTINUOUS PROCESS FOR THE ALKALINE ALCOHOLYSIS OF POLYVINYL ESTERS

Leo M. Germain, Shawinigan Falls, Quebec, Canada, assignor to Shawinigan Chemicals Limited, Montreal, Quebec, Canada, a corporation of Canada No Drawing. Application July 22, 1952,
Serial No. 300,347

16 Claims. (Cl. 260—91.3)

This invention relates to an improved process for the alkaline alcoholysis of polyvinyl esters, in particular, a process for the preparation of polyvinyl alcohol and partial esters thereof.

PRIOR ART

It is well known that polyvinyl esters, for example polyvinyl acetate, may be reacted with a simple alcohol, for example methanol, in the presence of an alkaline catalyst; metathesis between ester and alcohol takes place, and polyvinyl alcohol and an ester of the simple alcohol are formed. In complete metathesis of the long chain polyvinyl esters, each acid residue is replaced by the hydroxyl group of an alcohol molecule; when some, but not all of the acid residues of a polyvinyl ester have been so replaced, the polyvinyl material is herein referred to as a polyvinyl partial ester, and the term polyvinyl alcohol as herein used refers to polyvinyl material in which substantially all of the acid residues are replaced by hydroxyl groups. Berg, in U. S. Patent 2,227,997 has described an example of this alcoholysis process which consists of reacting a polyvinyl ester with an alcohol (with or without an inert diluent) in the presence of an hydrolysis catalyst, the proportion of alcohol (plus inert diluent, if any) being such that the polyvinyl ester is apparently not completely dissolved, but a plastic or doughy mass is formed; by mechanically working the mass, the alcoholysis reaction proceeds and finally the mass is converted to a slurry of the alcoholysis product, from which slurry the pure product may easily be separated. Earlier, Hermann et al., in U. S. 2,109,883, had disclosed that polyvinyl ester in solution in a considerable excess of suitable alcohol such as methanol, could react with the alcohol, in the presence of alkaline catalyst and under agitation, to precipitate an easily filtered powder of polyvinyl alcohol. Also, Scott et al., in U. S. 2,266,996, have described the alcoholysis process in which the degree of alcoholysis of polyvinyl esters is controlled by the amount of diluent (specifically, ester product) used along with the original reactants.

The process of Hermann et al. is suitable for the alcoholysis of low molecular weight polyvinyl esters only, unless very dilute solutions are used. The process of Berg requires the use of strong, heavy-duty mixing equipment to work the doughy plastic mass. Because of the consistency of the doughy mass, it is difficult or impossible to obtain intimate and adequate mixing, and the polyvinyl partial ester products prepared by the Berg process lack homogeneity, i. e., the rate of alcoholysis is not uniform throughout the doughy mass and the resultant product does not have a uniform degree of alcoholysis. The Scott et al. process is most similar to the Berg process; it utilizes more dilute solutions of the reactants but overcomes only part of the mechanical difficulty of mixing viscous reactants. None of these processes is suitable for continuous operation, and the necessary batch operations seriously limit the economic feasibility of the processes in large scale operation.

It has been discovered that solutions of polyvinyl esters, for example polyvinyl formate, polyvinyl acetate, polyvinyl propionate, etc., can be reacted to any desired degree of alcoholysis greater than about 55% of complete alcoholysis, by the catalytic action of alkaline alcoholysis catalyst and alcohol, with the reaction being carried out as a continuous production process not requiring the use of heavy-duty mixing equipment.

The invention

The process of the invention comprises forming a mobile solution of polyvinyl ester of a saturated lower aliphatic monocarboxylic acid in a liquid which, combined with the liquid products of alcoholysis of the polyvinyl ester and with any residual alcohol from the alcoholysis reaction, is not a solvent for the solid product of the alcoholysis, continuously blending a stream of the polyvinyl ester solution with a stream of alcoholic solution of alkaline alcoholysis catalyst, rapidly and intimately mixing the two streams during passage through a mixing zone to form a homogeneous reacting mixture containing at least sufficient hydrolytic alcohol to complete the desired alcoholysis reaction, conveying the mixture through a reaction zone of uniform temperature, without further mixing or agitation, until gelation of the reactants and syneresis of the resultant gel have occurred, and neutralizing the catalyst in the gel with dilute acid when alcoholysis has proceeded to the desired degree.

The effects of allowing the alcoholysis reaction to proceed without agitation, after initial mixing of the reactants to form a uniform reaction mixture, are unexpected and unusual. Firstly, it will be noted that the acoholysis reaction proceeds uniformly to completion once the reactants and catalyst are uniformly mixed in solution, even though the reactants solidify to a stiff gel. Thus it is obvious that prolonged mixing is not essential for uniform reaction nor for the formation of a uniform product. The reactants need only be mixed for a short initial period, while they are in the form of a solution of mobile viscosity, to assure homogeneity of the reacting materials; a homogeneous product is obtained without further mixing. Secondly, it will be noted that in every case, starting with a polyvinyl ester solution having a mobile viscosity, the reaction proceeds along the course and through the stages outlined below, irrespective of the polymeric molecular weight of the reactant polyvinyl ester. In no case is a precipitate formed, and in each case the desired product is recovered in the same form, described below. Thirdly, the form in which the product is obtained is unique; it gives the product certain desirable properties, described below.

The process of the invention can be used for the alcoholysis of polyvinyl esters of all the usual polymeric molecular weights. Differences in the molecular weights are characterized by differences in the viscosities of arbitrary standard solutions of the polymers. For example, 86 grams of polyvinyl acetate dissolved in benzene to form 1 litre of solution forms a standard solution whose viscosity, for most vinyl acetate polymers, will be in the range between about 5 and 800 centipoises. These polymers may be made by polymerization of vinyl acetate in solution, in aqueous dispersion, or in mass. All these polymers can be converted to polyvinyl partial esters and to polyvinyl alcohol by the process of this invention. The concentration of polyvinyl ester in the solution used in the process must be adjusted to give a solution which has, at the reaction temperature, a viscosity sufficiently high that the solution will not form a precipitate of the product, but will form a self-sustaining gel, and yet not too high, so that it may be uniformly and rapidly blended with the catalyst solution by light stirring devices. Solutions of about 1 to 800 poises viscosity are preferred, and those of about 1 to 80 poises viscosity are especially preferred.

Examples of suitable alkaline alcoholysis catalysts are sodium and potassium hydroxides, and sodium and potassium alcoholates. The amount of catalyst added to the polyvinyl solution may be between 0.5% and 1.5% by weight of the polyvinyl ester being reacted. Amounts within these limits are adequate to catalyze the alcoholysis of polyvinyl esters at reaction rates suitable for this invention, providing the reactants do not contain more water than is normally present in the commercial dry reactants. When the catalyst in alcoholic solution is blended with the polyvinyl solution, the two solutions will be found to mix intimately and uniformly. Preferably the alcoholic solvent for the catalyst is the same alcohol as is used, commonly, in the polyvinyl ester solution. The rate of reaction varies with the amount of catalyst added.

It must be noted that alkaline acloholysis catalysts, such as mentioned above, are converted to alkali salt by saponification with simple esters in the presence of slight amounts of water. Thus, since commercial reactants usually contain a trace of water, the catalyst used in this invention will gradually be destroyed during the course of the desired alcoholysis reaction. The destruction of the catalyst can be used effectively to assist in achieving the desired degree of alcoholysis of the reactant polyvinyl ester. The amount of catalyst added with the reactants can be adjusted to leave substantially no residual catalyst in the reactants after the alcoholysis reaction has proceeded to the desired degree; in the absence of catalyst, the alcoholysis reaction cannot proceed further. With gradual destruction of the catalyst as the alcoholysis reaction proceeds, the desired degree of alcoholysis will be approached at a decreasing rate; this facilitates neutralization of the catalyst with acid, if necessary, at the exact desired degree of alcoholysis.

Alcoholysis of polyvinyl ester in alcoholic solution begins as soon as catalyst comes in contact with the solution. Hence it is desirable to attain intimate mixing of catalyst and polyvinyl ester as rapidly as possible. As soon as a uniform mixture of catalyst and polyvinyl ester is obtained, mixing is no longer necessary and must be avoided, as previously mentioned; the catalyst and reactants are allowed to continue reaction undisturbed until syneresis has occurred, and preferably until the desired degree of reaction has been achieved, the catalyst can then be neutralized and reaction stops immediately.

The alkaline alcoholysis catalysts suitable for the process of this invention can readily be neutralized with dilute solutions of acid. Generally, simple organic acids, for example acetic acid, in solution in an inert non-solvent medium, are used to neutralize the catalyst. The non-solvent medium may conveniently be alcohol if the product is insoluble therein, or the by-product ester produced in the alcoholysis reaction, or a mixture of these. Other suitable media are for example, the low-boiling petroleum fractions, such as ligroin.

Numerous minor modifications and substitutions of equivalents may be made in the process of this invention as briefly outlined above. For example, the solution of polyvinyl ester may contain only methanol as a solvent; methanol is the most reactive alcohol for the process of this invention, and its use as the sole solvent is preferred. Other anhydrous alcohols by themselves are not solvents for polyvinyl esters except at temperatures higher than ordinary room temperature; since continuous operation at elevated temperatures is awkward and impracticable compared to operation at room temperature, the alcohols other than methanol are seldom used. As previously pointed out, the methanol may contain various proportions of inert solvent diluent, such as a proportion of the ester formed in the subsequent metathesis. The solution must contain at least sufficient methanol for alcoholysis of the polyvinyl ester to the desired degree, of course. The use of such an inert diluent is particularly expedient when the higher polymeric vinyl esters are being handled, because solutions of these polyvinyl esters must be comparatively dilute to be of mobile viscosity, and the expense due to solvent losses is minimized by the use of by-product materials and cheaper diluents. Again as an example, it can be pointed out that the process of this invention may be used for the alcoholysis of copolymers of major proportions of vinyl esters with minor proportions of other polymerizable monomers, providing that the copolymer is soluble in the reaction medium and that the copolymer product of alcoholysis is insoluble in the resultant liquid medium. Examples of such copolymers are ethylene/vinyl acetate copolymer, methyl methacrylate/vinyl acetate copolymer, dimethyl fumarate/vinyl acetate copolymer, and similar copolymers. As another example, it can be pointed out that various mechanical expedients may be used to convey the reactants at uniform temperature without agitation during the period of gelation and syneresis, such as endless belt conveyors, rotating casting wheels, troughs, etc.

A critical point in the operation of the process of this invention is the blending of the polyvinyl ester solution and the catalyst solution. It is desirable that all portions of the solution of polyvinyl ester be in contact with catalyst for the same length of time. Thus it is essential that, as a stream of polyvinylester solution is blended with a stream of catalyst solution, the mixing must be rapid, complete, and with a minimum of back-mixing, i. e. a minimum of eddying flow of material counter-current to the normal direction of flow of the solutions. As soon as the component solutions have been intimately blended they should be conveyed from the mixing zone so that no further mixing and back-mixing can occur.

When the reactants emerge from the mixing zone, they should be conveyed without further mixing until reaction has proceeded to the desired degree of alcoholysis. The reaction will be found to proceed through three stages, as follows: (1) The blended solutions usually develop a slight color due to impurities in commercial reactants, and there is a drop in viscosity of the resin solution due to dilution by the catalyst solution then the viscosity of the mixture gradually increases as alcoholysis proceeds, until the mixture, which becomes highly viscous and sticky, eventually sets to a stiff gel; (2) alcoholysis continues in the rubbery sticky gel while considerable by-product ester is formed; finally (3) syneresis occurs, i. e., a slight contraction of the gel, and separation of free liquid therefrom; when free liquid, which is mostly by-product ester but may contain some alcohol, is exuded, the gel is no longer sticky but is a rubbery solid which can be cut cleanly with a knife and can be comminuted easily in commercial disintegrating devices. Thus it will be seen that when the reactants are removed from the mixing zone, they are liquid and must be contained until they have set to a gel and syneresis has occurred. After syneresis the reactants can be readily removed and handled as a solid. Since reactants are continuously being blended and discharged from the mixing zone, they are most conveniently handled, from there, in a continuous conveyor until syneresis has occurred.

The time required for alcoholysis of a polyvinyl ester to any desired degree of alcoholysis, under uniform conditions, can be determined from a series of experimental operations. Thereafter, any desired degree of alcoholysis is attained by allowing the reaction to continue until the period between (a) initial contact of the catalyst and polyvinyl ester solution and (b) neutralization of the catalyst, is equal to the predetermined reaction time. The reactants are thus most conveniently reacted by blending them at a uniform rate, conveying them as a continuous train for the required reaction time, then neutralizing the catalyst in the products at a rate equivalent to the rate of feed of reactants to the process.

To assure rapid, uniform, and complete neutralization of the catalyst, it is expedient to comminute the reaction product before it is treated with acid to neutralize the catalyst. The acid is able to penetrate the small particles of product rapidly, and homogeneity of the degree of alcoholysis is assured by complete and even neutralization of the catalyst. After syneresis, the product is not sticky, and can be disintegrated cleanly by any sharp cutting edge.

The process of this invention is most conveniently carried out at room temperature. With convenient concentrations of catalyst as herein exemplified, the alcoholysis is complete within three hours at room temperature, and a shorter time is adequate for partial alcoholysis. The reaction is more rapid at higher temperatures and slower at lower temperatures. With continuous operation and consequently a fixed time of reaction, fluctuations in the temperature of reaction will cause fluctuations in the degree of alcoholysis achieved during reaction. Since it is desirable to obtain a product with a uniform degree of alcoholysis, it is essential to maintain the temperature of reaction as uniform as possible. This can be done easily by controlling the temperature of the surroundings of the reaction, and shielding the reaction from drafts and stray air currents. Shielding will also inhibit undue evaporation and loss of exuded liquid products of reaction.

While the rate of reaction of the process of this invention is markedly affected by the concentration of catalyst, and slightly affected by the temperature, it is only very slightly affected by the relative concentrations of solid and liquid reactants and liquid diluents. However, the relative concentrations do affect the course of the reaction in various ways. Consequently, variations in the relative concentrations can be used to control the course of the reaction to obtain the desired result.

As an illustration of the foregoing principle, it can be observed that polyvinyl acetate resin dissolved in methanol to form a solution containing 33% resin by weight in presence of alkaline alcoholysis catalyst, reacts as previously described for the first stage of the reaction, gelation, and completes this first stage by the time the resin has been converted to contain about 56% by weight of residual polyvinyl acetate. The second stage of the reaction is completed and syneresis begins when the resin has been converted to contain about 35% by weight of residual polyvinyl acetate. However, if methyl acetate is included as an inert diluent with the reactants, gelation and syneresis occur earlier in the conversion of polyvinyl acetate to polyvinyl alcohol. Thus a solution of 33 parts polyvinyl acetate resin in 25 parts methyl acetate and 42 parts methanol, in presence of alkaline alcoholysis catalyst as in the foregoing reaction, reacts as previously described and completes the first stage of reaction by the time the resin has been converted to contain about 65% by weight of residual polyvinyl acetate; the second stage of the reaction is completed and syneresis begins when the resin has been converted to contain about 42% by weight residual polyvinyl acetate. Thus it is seen that replacement of part of the solvent reactant by an equal weight of solvent product has increased the residual polyvinyl acetate content of the product at the point at which synerisis begins, and such product may be made the final product of the reaction by immediate neutralization of the catalyst.

In general, it is also found that the first stage of the reaction is completed later in the conversion of the polyvinyl ester, when the proportion of resin to solvent is lower, i. e. the residual ester content of the resin product is lower, at the time of gelation, in the more dilute reaction solutions; however, it is also generally true that the second stage of the reaction is completed, and syneresis begins sooner after gelation, when the proportion of resin to solvent is lower, i. e., the residual ester content of the resin product is higher after syneresis, in the more dilute reaction solutions.

Examples

The following elements of apparatus were assembled to carry out illustrations of the process of this invention, and the herein described examples were carried out in this apparatus: (1) A small gear pump, mounted with a by-pass, to pump a continuous stream of a solution of polyvinyl ester resin from storage to a mixing device; the rate of feed to the mixer could be varied by varying the flow in the by-pass, and the delivery rate held constant to within plus or minus 2%, (2) A small stainless steel bellows pump, to pump a steady supply of catalyst solution to the mixing device, (3) A small mixing device into the bottom of which the catalyst solution and the polyvinyl ester resin solution could be pumped; the solutions, blended during concurrent flow through the mixer, could be delivered through flexible tubing from the mixer to a continuous conveyor, (4) A continuous conveyor in the form of an endless flexible belt 4½ in. wide, mounted to turn about a set of horizontal rollers and with a horizontal run of five feet; a set of rigid guides, mounted along the horizontal run of the belt, folded it to form a trough along the greater part of the length of the horizontal run; the trough contained and conveyed, at a rate of about 2 inches per minute, reactants flowing from the mixing device onto the belt, until the reactants set to a gel and syneresis of the gel occurred.

The following series of examples was carried out with reactants and equipment held at a temperature of 20° C. by means of water-jackets, surrounding or shielding the equipment, through which water at 20° C., was continuously pumped. The examples were carried out using a series of vinyl acetate polymers of different polymeric molecular weight. The different polymers are characterized by the viscosity in centipoises of a solution in benzene of 86 grams of the polymer in a liter of solution. Hence a polymer which has a solution viscosity of 60 centipoises is herein termed a grade V60 polymer and one having a solution viscosity of 15 centipoises is designated as a grade V15 polymer, etc. Methanol was used as the reactant alcohol in each example, and the catalyst used was a solution of sodium hydroxide in methanol.

The following table lists the series of Examples 1 to 17, giving the standard solution viscosity of the polyvinyl acetate resin used in each example, the relative compositions of the solution of polyvinyl acetate and the solution of catalyst used in each example, and the rates of feed of the reactants in each example.

The procedure used in Examples 1 to 17 was as follows:

1. The polyvinyl ester resin solution was made by dissolving the resin in methanol or methanol-methyl acetate mixture, to give a solution according to the composition indicated for the example in the table; the solution was stored in a water-jacketed tank and pumped continuously from the tank to the mixing device at the rate indicated in the table.

2. The catalyst solution was made by dissolving sodium hydroxide in methanol to give a solution of required strength indicated in the table; the solution was stored in a jar and pumped continuously from the jar to the mixing device at the rate indicated in the table.

3. The resin solution and catalyst solution, pumped continuously to the mixing device, passed through a zone of mixing, and were blended therein, for a period of about two minutes.

4. From the mixing device, the fluid reactants flowed into the trough of the flexible belt previously described, and were conveyed by the belt through a zone of uniform temperature covered by a water jacketed shield; moving at the rate of two inches per minute, the belt conveyed the reactants to the discharge end in thirty minutes. Gelation of the reactants and syneresis of the gel occurred during passage of the reactants through the zone of uniform temperature. The time required for syneresis after initial mixing of the reactants was about 18 to 20 minutes.

5. From the discharge end of the belt conveyor the product issued continuously in the form of a rubbery solid rod slightly moist with liquid by-product and having a cross section the same shape as the cross section of the flexible trough. This rod was removed from the belt and sections of it comminuted, by a single passage through a domestic type of food chopper to roughly 4 mesh particle size; reaction in the comminuted material was still taking place, and the material was held at uniform temperature until the reaction, from the time of mixing of the reactants, had proceeded for a period of minutes indicated for the example in the table.

6. When the reaction had proceeded for the desired time the comminuted material and the liquid by-product were dumped into a bath of liquid non-solvent for the solid product. The bath was kept slightly acidified with acetic acid, and the alkali catalyst in the product was completely neutralized simply by steeping the product in the bath. In Examples 1, 2, and 10, where the product contained a high proportion of residual polyvinyl acetate, the bath was a ligroin petroleum fraction acidified with acetic acid, and in the other examples, the bath was a mixture of methanol and methyl acetate acidified with acetic acid.

7. After neutralization of the catalyst, the solid product was separated from the bath and dried in a tray drier. The final product in each case was a white or translucent slightly colored resin. The composition of the final product of each example is listed in the table. Also listed in the table is the time of reaction for each example, i. e., the time allowed to lapse between initial mixing of reactants and catalyst and neutralization of the catalyst.

TABLE

| Ex. No. | Polymer Grade | Resin Soln. Compn. | | | NaOH in Cat. Solution | Soln. Feed Rates | | Reaction Time | Residual Polyvinyl Acetate in Product |
|---|---|---|---|---|---|---|---|---|---|
| | | Resin | Methanol | Methyl Acetate | | Resin | Catalyst | | |
| | | G. | G. | G. | G./l | G./min. | G./min. | Min. | Percent |
| 1 | V1½ | 80 | 12½ | 7½ | 16 | 33 | 9 | 32 | 57.1 |
| 2 | 2½ | 65 | 20 | 15 | 16 | 35 | 10 | 32 | 60.3 |
| 3 | 7 | 55 | 45 | 0 | 16 | 33 | 11 | 200 | 0 |
| 4 | 7 | 55 | 45 | 0 | 16 | 32 | 11 | 58 | 14 |
| 5 | 7 | 55 | 45 | 0 | 16 | 32 | 9½ | 58 | 31 |
| 6 | 7 | 50 | 20 | 30 | 14 | 35 | 12 | 32 | 60 |
| 7 | 15 | 45 | 55 | 0 | 16 | 35 | 5 | 200 | 0 |
| 8 | 15 | 45 | 55 | 0 | 16 | 35 | 5 | 38 | 23.1 |
| 9 | 15 | 45 | 55 | 0 | 16 | 35 | 5 | 32 | 31.5 |
| 10 | 15 | 40 | 30 | 30 | 16 | 35 | 8 | 32 | 54.3 |
| 11 | 60 | 30 | 70 | 0 | 16 | 35 | 5 | 200 | 0 |
| 12 | 60 | 30 | 70 | 0 | 16 | 35 | 5 | 70 | 10.1 |
| 13 | 60 | 30 | 70 | 0 | 16 | 35 | 5 | 48 | 19.2 |
| 14 | 500 | 20 | 80 | 0 | 16 | 35 | 7 | 200 | 1.2 |
| 15 | 500 | 20 | 80 | 0 | 16 | 35 | 7 | 48 | 10 |
| 16 | 500 | 20 | 80 | 0 | 16 | 35 | 7 | 32 | 20 |
| 17 | 500 | 20 | 80 | 0 | 16 | 35 | 5 | 32 | 30 |

In the foregoing examples, Examples 1 and 2 illustrate the preparation of alcoholysis products, containing high proportions of residual polyvinyl ester, from low polymers of polyvinyl acetate. Examples 3 and 7 illustrate the preparation of the alcoholysis product containing no residual ester groups, i. e. the preparation of polyvinyl alcohol, from medium molecular weight polymers of vinyl acetate, and Examples 11 and 14 illustrate the preparation of polyvinyl alcohol from high molecular weight polymers. A comparison of Examples 3 and 4 illustrates the effect of reducing the time allowed for reaction from 200 minutes to 58 minutes; the residual ester content of the product in Example 4 is 14% residual polyvinyl acetate by weight. A comparison of Examples 4 and 5 illustrates the effect of reducing the amount of catalyst; in the same reaction time, 58 minutes, the reaction has proceeded more slowly in Example 5, and the residual ester content of the product is 31% polyvinyl acetate by weight. Example 6 shows that, even with larger amounts of catalyst, the residual ester content of the product can be kept high by decreasing the reaction time still further and by having inert solvent diluent present with the initial reactants. The effect of inert diluent is again illustrated in a comparison of Examples 9 and 10. The effect of shortening the reaction time is well illustrated in a comparison of Examples 7, 8 and 9. Examples 11 to 17 illustrate the alcoholysis of high polymers of vinyl acetate, the product of Examples 11 and 14 being the complete or practically complete alcoholysis product. A comparison of Examples 16 and 17 again illustrates the effect of reducing the amount of catalyst used; comparisons of the other examples in this group illustrate the effect of reducing the time allowed for reaction.

*Example 18*

A solution containing 40 grams of V–500 grade polyvinyl acetate in 40 grams of benzene and 120 grams of methanol was rapidly mixed with 35 ml. of NaOH catalyst solution containing 16 gr. NaOH per liter of methanol, to form a homogeneous reacting mixture, then the homogeneous mixture was kept at a uniform temperature without further mixing. Alcoholysis of the polyvinyl acetate proceeded and the reacting mixture gradually gelled, then syneresis of the gel occurred about 18 minutes from the time of initial mixing of the polymer and catalyst solutions. The solid product could then be cut cleanly with a knife and a partially hydrolyzed polyvinyl acetate having a desired degree of alcoholysis obtained therefrom.

*Example 19*

The procedure of the above Example 18 was repeated using 40 grams of acetone in place of the 40 grams of benzene. The results were similar to those of Example 18, except that syneresis occurred 16 minutes after initial mixing of the reactants.

*Example 20*

A copolymer containing 75% vinyl acetate and 25% dimethyl fumarate was dissolved in a mixture of benzene and methanol to form a solution containing 25 grams of the copolymer in 15 grams of methanol and 60 grams of benzene. To the solution was added 2 ccs. of NaOH catalyst solution containing 137 grams NaOH per liter of methanol. The two solutions were mixed intimately for a few seconds, then kept at a uniform temperature, without further mixing, while reaction proceeded. The mixture gradually set to a gel, then syneresis of the gel occurred about 15 minutes from the initial mixing of the copolymer and catalyst solutions. The product could then be cut cleanly with a knife, and a partially hydrolyzed copolymer of vinyl acetate and dimethyl fumarate obtained by neutralizing the residual catalyst with acid.

In all examples of the process of this invention, including each of the preceeding examples, the stiff gel product left after syneresis has an unusual structure, due to the method of its formation. Before syneresis, the gel is a single homogeneous phase. When syneresis occurs, a second phase, i. e., liquid, appears. The liquid is exuded from the submicroscopic micelles of the polymer, and forms tiny pockets of liquid throughout the gel. These render the solid phase imperceptibly porous or cellular in structure, and give it a large internal surface area. As the liquid phase exudes and evaporates, the solid phase gradually contracts, and the external dimensions shrink measurably over a period of several hours. The porous structure of the solid phase facilitates neutralization of the catalyst therein, as the acidic non-solvent liquid which is added to the products to neutralize the catalyst can rapidly penetrate through the solid and effect uniform neutralization. The cellular structure of the solid product is thus seen to be a distinct advantage and a desirable property resulting from the process of this invention.

Polyvinyl alcohol and polyvinyl partial esters prepared by the process of this invention are found to go into solution much more rapidly than similar products in the same state of sub-division but prepared by another process wherein crystallinity is induced in the product. In some cases a product of this invention has been found to go into solution ten times as rapidly as a similar product prepared by another process. This ease of solution is an additional advantage of the form of the product of the process of this invention. It is believed that, in the process of this invention, when gelation of the reactants from solution occurs, the polymeric molecules have random orientation, and the resultant solid product should be a truly amorphous solid. Orientation of the polymeric molecules, or partial crystallinity of the solid product, is completely avoided by avoidance of stirring or agitation or stressing of the reactants in the solid phase before syneresis occurs. In other processes for the alcoholysis of polyvinyl esters, when reactants in the solid or highly viscous solution or gelatinous state are subject to orientating forces of stretching or tension, incident to mixing and agitation, there is a definite degree of crystallinity in the solid products, which crystallinity is the antithesis of the completely amorphous form of the solid product of the process of this invention. The difference between the amorphous form of the solid product of the process of this invention, and the crystallinity in the products of other processes, is apparent from observation of the relative rates of solution of the products.

Another advantage of the process of this invention is a saving in equipment and power required to operate the process. The only stirring equipment required is a relatively small mixer needed to blend two liquid solutions. Only very little power is required to blend these mobile solutions; this is a sharp contrast to the large amount of power required to mix the reactants continuously through the viscous stages of reaction in other processes. The relative size of the mixing equipment required for the process of this invention may readily be judged when it is observed that the reactants in the examples are mixed for only about 1% to 10% of the total reaction time. This is equivalent to mixing only one tenth to one one-hundredth of the material actually processed in other processes.

For convenient reference, it can be pointed out that a particular polyvinyl partial ester, specifically partially-hydrolyzed polyvinyl acetate, in which the degree of alcoholysis is greater than about 55% of complete alcoholysis, will have a maximum polyvinyl acetate content of about 62%, with smaller polyvinyl acetate content corresponding to higher degrees of alcoholysis. A degree of alcoholysis of 55% in a polyvinyl partial ester indicates replacement of 55% of the acid residue groups in the polyvinyl ester chain by hydroxyl groups; 100% alcoholysis corresponds to complete conversion of the polyvinyl ester to polyvinyl alcohol, i. e., complete replacement of the acid residue groups by hydroxyl groups.

In application Serial No. 153,303, filed March 31, 1950, allowed May 19, 1952, being forfeited in favor of this application, and of which this application is a continuation-in-part, it was disclosed that this invention could be carried out with solutions of polyvinyl esters of lower aliphatic monocarboxylic acid at a concentration having a viscosity of about 1 to 80 poises at the reaction temperature. It has since been discovered that solutions of from about 1 to 800 poises can be used satisfactorily, and this application is directed to the complete range now known to be operable.

It is to be understood that the invention is not restricted to the specific embodiments thereof described hereinabove but embraces all such variations, modifications, and equivalents as fall within the scope of the appended claims.

What is claimed is:

1. A process for the alkaline alcoholysis of a polyvinyl ester of a saturated lower aliphatic monocarboxylic acid to a desired degree greater than about 55% of complete alcoholysis, comprising (1) forming a solution of the ester at a concentration having a mobile viscosity at the temperature of reaction, in a liquid which, combined with the liquid products of alcoholysis of the polyvinyl ester and with any residual alcohol from the alcoholysis reaction, is not a solvent for the solid product of the alcoholysis, (2) mixing a continuous stream of the said solution with a continuous stream of an alcoholic solution of an alkaline alcoholysis catalyst in lower aliphatic monohydric alcohol during passage through a mixing zone, to form a continuous homogeneous stream of reacting solution containing at least sufficient alcohol to carry out the desired reaction, (3) continuously conveying the said solution, without further mixing, through a reaction zone while maintaining it at constant temperature until gelation and syneresis have occurred, (4) continuously removing the resultant products of reaction from the reaction zone as the desired degree of alcoholysis is achieved, and (5) neutralizing the catalyst in the resultant solid product by treating the said solid product with an acidified liquid which is an inert non-solvent for the solid product.

2. A process as claimed in claim 1, wherein the solution of the polyvinyl ester has a viscosity of about 1 to 80 poises at the temperature of reaction.

3. A process as claimed in claim 2 in which the polyvinyl ester is polyvinyl acetate.

4. A process as claimed in claim 3, in which the solvent for the polyvinyl acetate solution is a member of the group consisting of methanol and mixtures of methanol with methyl acetate.

5. A process as claimed in claim 4 in which the liquid which is an inert non-solvent for the solid product is a member of the group consisting of methanol, methyl acetate, ligroin, and mixtures of these.

6. A process as claimed in claim 5 in which the catalyst is a member of the group consisting of sodium hydroxide, potassium hydroxide, sodium alcoholate, and potassium alcoholate.

7. A process as claimed in claim 6 in which the continuous stream of reacting solution is conveyed on a flexible moving belt.

8. A process as claimed in claim 7, in which the solid product is comminuted before neutralization of the catalyst.

9. A process for the alcoholysis of polyvinyl acetate to a desired degree greater than about 55% of complete alcoholysis, comprising (1) forming a solution of the polyvinyl acetate in a liquid comprising methanol, said solution having a mobile viscosity at the temperature of reaction, said liquid, when combined with methyl acetate, being a non-solvent for the solid product of alcoholysis, (2) blending a continuous stream of the solution with a continuous stream of a methanol solution of an alkaline alcoholysis catalyst by mixing the two streams during concurrent passage through a zone of agitation, to form a homogeneous reacting solution, (3) continuously conveying the resultant reacting solution, without further mixing, through a reaction zone while maintaining it at constant temperature until gelation and syneresis have occurred, (4) continuously removing the resultant products of reaction from the reaction zone as the desired degree of alcoholysis is achieved, and (5) neutralizing the residual catalyst in the products with an acidic solution of a liquid which is an inert non-solvent for the solid product.

10. A process as claimed in claim 9, wherein the solution of the polyvinyl acetate has a viscosity of between 1 and 80 poises at the temperature of reaction.

11. A process as claimed in claim 10, in which the solution of polyvinyl acetate contains also a proportion of inert solvent as a diluent.

12. A process as claimed in claim 11, in which the inert solvent is methyl acetate.

13. A process as claimed in claim 12, in which the solid product of reaction is comminuted before neutralization of the catalyst.

14. A process as claimed in claim 13, in which the catalyst is a material of the group consisting of sodium hydroxide, potassium hydroxide, sodium alcoholate and potassium alcoholate.

15. A process as claimed in claim 9, in which the amount of alkaline catalyst added with the reactants, and converted to alkali salt by saponification with methyl acetate during the alcoholysis reaction, is adjusted to leave substantially no residual catalyst in the reactants when the alcoholysis reaction has proceeded slightly beyond the desired degree.

16. A process as claimed in claim 1, in which the polyvinyl ester contains a portion of another monomer copolymerized therewith, not exceeding the weight of the polyvinyl ester.

LEO M. GERMAIN.

References Cited in the file of this patent

UNITED STATES PATENTS

| Number | Name | Date |
|---|---|---|
| 2,266,996 | Scott | Dec. 23, 1941 |
| 2,356,896 | Smith | Aug. 19, 1944 |
| 2,386,995 | Wigal | Oct. 16, 1945 |
| 2,467,774 | Plambeck | Apr. 19, 1949 |
| 2,481,388 | Bryant | Sept. 6, 1949 |
| 2,499,097 | Hrok et al. | Feb. 28, 1950 |

FOREIGN PATENTS

| Number | Country | Date |
|---|---|---|
| 875,864 | France | Oct. 7, 1942 |

OTHER REFERENCES

Blackie et al., Industrial & Engineering Chem., vol. 28, 1936, pp. 1155–1158. (Copy in Scientific Library 260/913).